3,196,023
AIR FIRED BERYLLIA WARE
John G. Theodore, Willowick, and Chester A. Bielawski, Cleveland, Ohio, assignors to The Brush Beryllium Company, Cleveland, Ohio, a corporation of Ohio
No Drawing. Filed Feb. 27, 1962, Ser. No. 176,125
4 Claims. (Cl. 106—57)

This invention relates to beryllia ceramic ware having relatively high purity and theoretical density, and particularly to a method of fabrication of beryllia ware by the slip casting technique.

It is well known that several conventional methods for pressure compacting pulverulent materials have several disadvantages which do not permit for the forming of complicated shapes, either large or small. These methods include, among others, isostatic and unidirectional pressing, extrusion, and swaging. In order to offset these known disadvantages, pressureless compacting methods have been resorted to, such as loose powder sintering and slip casting.

In general, the slip casting method of forming bodies is in itself old and well-known and has been succuessfully applied in commercial production. This ceramic technique is used for forming both simple and complicated shapes without the direct application of pressure.

As is generally understood in the art, "slip casting" refers to the pouring of a fluid suspension of pulverulent material into a cavity formed in a fluid-absorbing mold. The mold, in most cases, is composed of plaster of Paris. By capillary action, the fluid of the slip is drawn into the walls of the mold, leaving a mass of material, having a high degree of uniformity, and externally shaped to the configuration of the mold cavity. Thus, upon removal of the fluid, a slip-cast compact is formed which may be handled and trimmed prior to kiln firing. Upon firing, the compact increases in strength, density, and other well-known, desirable physical properties.

One of the many problems associated with beryllia slip casting fabrication is that in air firings, temperatures in excess of 1750° C. are required to produce substantially dense bodies. Thus, in order to obtain these high sintering temperatures, furnaces of specific laboratory design, employing either gaseous combustion mixtures of oxygen and propane or oxygen and acetylene, are utilized. If such temperatures are not used, the article produced would have a relatively high porosity.

In order to be able to utilize the slip casting technique for fabricating beryllia compacts capable of being air fired under normal production conditions heretofore employed for firing other ceramic materials in conventional kiln facilities, the slip must have good reliability and reproducibility characteristics, while having a non-thixotropic quality or trait. Further, the rheology of the slip must be controllable. The type and amount of deflocculating agent used, and its possible chemical reaction with the fluid or liquid vehicle and with the ceramic component in the slip, in the main, control the rheology.

In slip casting beryllia amenable to such air firing, an essential part of the invention is the deflocculated system used, as disclosed hereinafter, to retard the settling rate of the ceramic particle components employed in the liquid medium or vehicle, and further, to obtain the proper fluidity or slip viscosity and, in turn, the proper hydrogen ion concentration.

A further essential part of this invention is the type and amount of supplemental additive used to beneficiate the air fired sinterability by lowering the maturing temperature below those presently used in the manufacture of dense beryllia ware.

It is therefore an object of this invention to provide a beryllia slip-cast compact amenable to air firing, in production type kiln facilities, to higher densities than heretofore obtainable with air firing procedures.

Further objects are to provide a reliable and reproducible beryllia slip capable after casting of being sintered in air to relatively high densities; to provide a beryllia slip of relatively high purity capable after casting of being air sintered to relatively high densities; to provide a beryllia slip capable after casting of being air fired to substantially low. and uniform porosity; to provide a beryllia slip of low viscosity and relatively low specific gravity while maintaining a good reproducible castability characteristic; and to provide a beryllia slip that can be economically utilized in a production process.

Another object, in conjunction with the immediately preceding object, is to provide a beryllia slip, amenable to air firing, which prolongs the useful life of the fluid-absorbing mold.

An still another object of the invention is to employ a supplemental additive in the slip-casting composition to beneficiate the sinterability of the slip compact by lowering of the maturing temperature of the beryllia.

A more specific object is to provide a castable beryllia slip, amenable to air firing to such relatively high density and having a hydrogen ion concentration in excess of 3 together with relatively low specific gravity and low viscosity.

A further object is to provide a method of manufacturing beryllia ware of relatively high density and purity in air fired kilns.

With these preceding objects in view and from a further more detailed description and explanation of the invention, other objects will become apparent from a consideration of this specification.

In practicing the present invention, high purity beryllia powder is employed for the slip. A commercially available form thereof is UOX, a proprietary product marketed by The Brush Beryllium Company, of −20 Tyler mesh or less, and having an approximate total maximum impurity level of 400 parts per million, which inclules the silicates, heavy metals, alkalis, and alkaline earths.

The powder is preconditioned to increase its apparent bulk density. This preconditioning cycle may be any form of mechanical cold working, such as cold pressing or extrusion, the purpose being to increase the bulk density of the beryllia thereby increasing the weight of the powder per given unit volume. This increased bulk density, in turn, decreases the amount of contamination introduced into the system during the subsequent milling operation disclosed hereinafter.

It should be noted that the input beryllia is non-recalcined, thereby eliminating the recalcination step of the generally accepted method of preparing beryllia powder for slip casting purposes.

After preconditioning, the powder is crushed or re-granulated, dependent upon the type of preconditioning employed, and charged into a ball or rod mill for wet comminuting purposes. The grinding medium may be either beryllia or alumina balls or rods. In order to minimize the amount of induced contamination as a result of wall abrasion in normal ball-milling practice, rubber-lined mills, steel balls, and other sources of contamination shoud be avoided.

The amount of powder charge added to the mill is equivalent to approximately 30 to 35% of the mill volume. Approximately 50 to 55% of the mill volume is charged with the grinding medium. The liquid vehicle is preferably distilled water. The resultant slurry has a weight ratio of about 1.5 parts water to about 1 part of the combined beryllia and supplemental additive, as will be disclosed hereinafter.

The slurry, with the additive, is milled for about eight hours at an approximate mill speed of 50 to 60 r.p.m. Should the milling time or speed be increased to 60 hours or 115 r.p.m., the amount of induced contamination resulting from the abrasion between the mill lining and grinding medium, would become excessive, thereby lowering the purity level of the end product. A more detailed explanation of the milling time, speed, etc., may be obtained by referring to our copending application entitled "Vacuum Fired Beryllia Ware," Serial No. 176,066, filed February 27, 1962, where the milling operation and particle size distribution are of a more critical nature.

In the milling operation, the aim is to obtain an overall fine particle size distribution to aid subsequent sintering. Although a beryllia grinding medium is preferred from the standpoint of contamination, on the same volume loading basis, an alumina grinding medium is more effective for comminution due to its higher density. Since the alumina medium is a high fired, "dead burn" material, the induced contamination is in a non-reactive form in the sense that it will not have either a beneficial or deleterious effect upon the densification of the beryllia slip compact.

Once the milling operation has proceeded for the nominal indicated time, the deflocculating agent, as disclosed hereinafter, is added, with frequent mixing, until the viscous slurry has been fluidized and a hydrogen ion concentration of a predetermined value attained. The slip is then aged, as is the usual practice, for about 48 hours at a constant temperature of approximately 30° C., to assure sufficient chemical reactions before final adjustments are made to assure final slip stability. After the final adjustments have been made and the slip is free from air bubbles, the slip is then ready for casting.

In pouring the slip into a mold, care should be exercised to avoid splashing and the formation of air bubbles which, if present, form air inclusions in the slip-cast compact. Preferably, U.S. No. 1 Pottery or Red Top No. 1 grade plaster of Paris is used to fabricate the mold. Both products are commercially obtainable from the U.S. Gypsum Company. Further, the molds are made in accordance with standard procedures as recommended by the manufacturer and as used in conventional slip molds. Other grades of plaster may be used, if desired, depending upon the casting rate, appearance of the slip compact, and other variables involved. In addition, predetermined amounts of free water may be introduced into the mold matrix, as is the preferred practice, to control the casting rate, if desired.

During the settling period, while the slip-cast compact is forming in the mold, continued additions of slip are made to maintain a constant fill volume within the mold to obtain uniform walls. The casting time will vary depending upon the wall thickness desired in the final product.

After the desired cast size has been obtained, the excess slip is drained and the flashing trimmed. The slip-cast compact is allowed to air dry at ambient room temperature within the mold for about eight hours, depending upon wall thickness, and other physical properties desired. The compact is then heated in air at a temperature preferably of about 60° C. or less, for about 12 hours, to avoid cracking and the like, after which it may then be removed from the mold and again trimmed. If necessary, thorough drying can be effected by a subsequent additional heating at 180° C.

To obtain the desired properties in the slip compact, the compact is positioned on the proper kiln furniture and air fired to a product temperature in excess of 1500° C., preferably 1540°±10° C. The length of time at temperature is dependent upon the working temperature and the furnace load, and is preferably about a three hour soak at 1540°±10° C. The heat-up rate may be at the rate of about 100° C. per hour as commonly used in the ceramic field. Standard furnace cooling is employed.

Referring to the deflocculating agent and supplemental additive employed to beneficiate densification of the beryllia ware, the following examples in Table I will best illustrate the invention herein disclosed for beryllia slip cast ware, such as tubes, boats, crucibles and cones.

The following Table I shows the pertinency of the supplemental additive.

*Table I.—Beryllia slip-casting mix amenable to 1540° C. ±10° C. air fire*

| Exam. No. | Type of preconditioned beryllia powder | Supplemental additive-type and concentration (wt. percent) | Milled slurry parameter | | |
|---|---|---|---|---|---|
| | | | pH | Visc. (cps.) | Sp. Gr. g./cc. |
| 1 | Not preconditioned | None | 8.21 | 1,900 | 1.19 |
| 2 | do | do | | | |
| 3 | do | 3.06% Al. Tri | 3 | 64 | 1.26 |
| 4 | Cold pressed: 8,000 p.s.i.; —8 mesh regranulated. | None | 4.8 | 8 | 1.02 |
| 5 | Extruded scrap; air fired at 800° C, 3 hrs.; crushed. | do | 8.01 | 3,615 | 1.38 |
| 6 | Cold pressed scrap; air fired at 800° C., 3 hrs.; crushed. | do | 8.42 | 1,360 | 1.18 |
| 7 | Cold pressed, 8,000 p.s.i.; —8 mesh regranulated. | do | 7.93 | 1,695 | 9.18 |
| 8 | do | 5.0% Al$_2$O$_3$ | 5.0 | 337 | 1.31 |
| 9 | Cold pressed, 8,000 p.s.i.; —8 mesh granulated. | 2.0% MgO | 11.10 | 8 | 1.18 |
| 10 | do | 2.0% MgO | 2.20 | 120 | 1.16 |
| 11 | See Example No. 5 | 3.06% Al. Tri | 8.24 | 1,650 | 1.19 |
| 12 | See Example No. 6 | 3.06% Al. Tri | 8.23 | 1,450 | 1.18 |
| 13 | See Example No. 4 | 2.00% Al$_2$O$_3$ | 8.36 | 2,800 | 1.18 |
| 14 | do | 2.00% Al$_2$O$_3$ 1.00% ZrO$_2$ | 5.0 | 70 | 1.30 |
| 15 | do | 1.58% Al. Tri | 8.21 | 1,880 | 1.18 |
| 16 | do | 3.06% Al. Tri | 8.28 | 2,750 | 1.19 |
| 17 | See Example No. 9 | 2.00% Al$_2$O$_3$ | 4.07 | 9 | 1.18 |
| 18 | do | 3.06% Al. Tri | 9.49 | 6 | 1.18 |
| 19 | do | 3.06% Al. Tri | 4.06 | 9 | 1.18 |

Table I—Continued

| Exam No. | Type and amount of defloccuant (wt. percent) | Parameters of casting slip | | | Fired parameters | | |
|---|---|---|---|---|---|---|---|
| | | pH | Visc. (cps.) | Sp. Gr. g./cc. | Shrinkage (percent total) | Density | |
| | | | | | | Of/cc. | Percent theor. |
| 1 | 2 N HCl, 1.1% | 4.00 | 22 | 1.19 | 31.5 | 2.32 | 77.1 |
| 2 | .003% sodium polymethacrylic acid | 8.52 | 8 | 1.19 | 29.8 | 2.35 | 78.1 |
| 3 | 2 N HCl, 0.9% | 3.10 | 18.6 | 1.07 | 16.4 | 2.71 | 90.1 |
| 4 | .0059% sodium polymethacrylic acid | 9.0 | 88.0 | 1.13 | 17.2 | 2.58 | 85.8 |
| 5 | 2 N HCl, 1.1% | 3.92 | 139.0 | 1.17 | 18.2 | 2.24 | 74.5 |
| 6 | 2 N HCl, 0.8% | 4.20 | 8.0 | 1.18 | 16.5 | 2.40 | 79.8 |
| 7 | 2 N HCl, 0.9% | 3.90 | 10.0 | 1.18 | | 2.13 | 70.8 |
| 8 | 2 N HCl, 3.7% | 4.0 | 19.6 | 1.08 | 16.0 | 2.58 | 85.8 |
| 9 | .0036% sodium polymethacrylic acid | 11.22 | 12.0 | 1.18 | 23.0 | 2.57 | 85.5 |
| 10 | 2 N HCl, 103.0% | 4.32 | 108.0 | 1.16 | 21.0 | 2.67 | 88.8 |
| 11 | 2 N HCl, 1.1% | 4.00 | 163.0 | 1.19 | 23.5 | 2.85 | 94.8 |
| 12 | 2 N HCl, 0.9% | 3.95 | 9.0 | 1.18 | 22.3 | 2.86 | 95.1 |
| 13 | 2 N HCl, 2.5% | 4.07 | 9.0 | 1.18 | 22.4 | 2.80 | 93.1 |
| 14 | 2 N HCl, 2.9% | 4.0 | 16.0 | 1.03 | 18.7 | 2.79 | 92.8 |
| 15 | 2 N HCl, 1.0% | 4.10 | 12.0 | 1.18 | 22.8 | 2.88 | 95.8 |
| 16 | 2 N HCl, 2.1% | 4.06 | 9.0 | 1.18 | 22.9 | 2.90 | 96.5 |
| 17 | 2 N HCl, 2.5% | 4.85 | 4.0 | 1.18 | 22.4 | 2.80 | 93.1 |
| 18 | .0024% sodium polymethacrylic acid | 9.56 | 5.0 | 1.18 | 27.7 | 2.82 | 93.8 |
| 19 | 2 N HCl, 2.1% | 4.87 | 5.0 | 1.18 | 22.9 | 2.87 | 95.4 |

NOTE.—Al. Tri. designates Alumina Trihydrate; 3.06% Al. Tri. equivalent to 2.00% $Al_2O_3$. Viscosity is in centipoises.

It can be seen by referring to Examples 1 through 10 of the above Table I, that regardless of the preconditioning, the type of deflocculant agent used, acidic or basic, and the type of mechanical preworking involved, without the additive the density of the final product achieved upon air firing is substantially below that of a commercially desirable product, having little commercial utility due to its inherent porosity and lack of other desirable properties.

It should be noted that no benefication of air sinterabiilty of beryllia is achieved by additions of magnesium oxide. Such a negative result is believed to be due to the formation of $Mg(OH)_2 \cdot X \cdot H_2O$, wherein X represents a water of hydration of 1 or more. Further, in order to properly deflocculate this particular developed slip, an excessive amount of 2 N hydrochloric acid is required. Such an amount causes a heavy erosion of the plaster mold, which is, of course, uneconomical.

It is evident from Examples 11 through 18, that the type and amount of supplemental additive employed, in combination with the preworked beryllia, beneficiates the air-fired sinterability of the beryllia, particularly in that it lowers its maturing temperature.

As is well known, the viscosity and pH factor of the slip are extremely important since they affect the properties of the end product. These two factors depend, in the main, upon the liquid-to-solid ratio and the type and amount of defloculating agent. Thus, in order to be able to produce a useful slip, the pulverulent material in suspension in the liquid medium must remain homogeneous. Further, the material must remain in suspension, without segregation, until after the slip compact has been formed. Should the slip have too rapid a settling rate of the pulverulent material or particles, a compact of uneven wall thickness or a compact susceptible to cracking will be formed. In addition, high viscosity slips not only cast or form a compact with extreme rapidity, but they also allow air to be entrapped in the formed walls, while lower viscosity slips cast more slowly, thereby inhibiting such a phenomenon.

In slip casting beryllia ware, ceramists have previously used slips having a hydrogen ion concentration in the range of 1 to 4, the higher pH being preferred, since thereby the molds are exposed to a lower acid concentration and with a consequent reduction in erosion.

Further, a slip having a specific gravity in the range of 1.8–2.0, indicaitng approximately 70% beryllia in suspension, was used.

In correlating viscosity and pH for different specific gravities, it is seen that a beryllia slip having a relatively high specific gravity, such as 1.8, with a pH of approximately 4, will have a flowable mass substantially more viscous than approximately 20 centipoise when an acidic deflocculant is used. Further, such a slip will have a substantially higher casting and shrinkage-upon-drying rate. Both of these factors promote excessive warping or cracking upon firnig. Also, with a high specific gravity, the optimum pH for sufficient deflocculation to produce a castable slip shifts drastically and becomes strongly acid. Such a concentration of hydrogen ion results in a high corrosion rate of the plaster molds. In our copending application, as mentioned hereinbefore, a family of beryllia slips with varying specific gravities are disclosed and correlated to show the effect mentioned.

Thus, by incorporating a singular supplemental additive, or binary supplemental additives, and preferably alumina or alumina trihydrate, in the slip, a beryllia compact having a purity in excess of about 96.5 percent amenable to air firing and having a density in excess of 93 percent of theoretical, is obtained.

While several examples have been herein disclosed, it is obvious that various changes might be made, without departing from the spirit and scope of the invention as set forth in the appended claims. Further, it is to be understood that all matter hereinbefore set forth is to be interpreted as illustrative and not in a limiting sense.

Having thus described our invention, we claim:

1. A slip for casting air firable compacts and consisting essentialy of beryllia, as the main constituent, and a powder selected from the group consisting of (a) alumina, (b) alumina trihydrate, and (c) a mixture of alumina and zirconia, said beryllia and powder being suspended in a liquid medium consisting essentially of distilled water and an acid deflocculating agent, and said suspension having a specific gravity less than about 1.4 and a pH of from about 3 to 10, said powder being in an amount of from about .75% to about 3.0%, by weight, of the combined oxides, when fired.

2. A slip according to claim 1 wherein the defloculating agent is one selected from the group consisting of hydrochloric acid and sodium polymethacrylic acid.

3. A method of producing slip cast beryllia ware of relatively high purity and densities of approximately 2.80 grams per cc. and comprising providing a quantity of beryllium powder, increasing the bulk density of the quantity of the berrylia powder, disintegrating the densified quantity of beryllia powder, forming a slurry consisting of water and the disintegrated beryllia powder, milling the slurry, and before the end of the milling operation, adding a material selected from the group consisting of (a) alumina, (b) alumina trihydrate and (c) a mixture of alumina and zirconia, in an amount of from 0.75% to 3.0%, by weight, of the combined oxides, when fired, adding an acid deflocculating agent to adjust the pH of the slurry to from 3 to 10, adding water to adjust the specific gravity of the slurry to about 1.4, casting the milled slurry into a green compact, drying the compact, and then air firing the dried compact at a temperature in excess of 1500° C.

4. The method according to claim 3 wherein said air firing is from 1530° C. to 1550° C.

References Cited by the Examiner
UNITED STATES PATENTS

| | | | |
|---|---|---|---|
| 1,879,589 | 9/32 | Tama | 106—65 |
| 2,033,300 | 3/36 | Reichmann | 106—65 |

OTHER REFERENCES

Refractories Bibliography, American Iron and Steel Institute and The American Ceramic Society, Inc., Columbus, Ohio, 1950, p. 1853.

TOBIAS E. LEVOW, *Primary Examiner.*

JOHN R. SPECK, *Examiner.*

UNITED STATES PATENT OFFICE
CERTIFICATE OF CORRECTION

Patent No. 3,196,023                                                 July 20, 1965

John G. Theodore et al.

It is hereby certified that error appears in the above numbered patent requiring correction and that the said Letters Patent should read as corrected below.

Column 2, line 25, for "An" read -- And --; line 46, for "inclules" read -- includes --; column 4, Table 1, sixth column, line 7 thereof, for "9.18" read -- 1.18 --; column 5, Table 1-Continued, seventh column, sub-heading thereof, for "Of/cc." read -- g./cc. --; same table, fourth column, line 4 thereof, for "88.0" read -- 8.0 --; column 6, line 33, for "indicaitng" read -- indicating --; line 43, for "firnig" read -- firing --; column 7, line 6, for "beryllium" read -- beryllia --; line 7, for "berrylia" read -- beryllia --.

Signed and sealed this 29th day of March 1966.

(SEAL)
Attest:

ERNEST W. SWIDER                                   EDWARD J. BRENNER
Attesting Officer                                         Commissioner of Patents